(12) United States Patent
Uchida et al.

(10) Patent No.: US 12,463,670 B2
(45) Date of Patent: Nov. 4, 2025

(54) OUTPUT CONTROL METHOD OF RADIO COMMUNICATION MODULE, MANUFACTURING METHOD OF RADIO COMMUNICATION MODULE AND OUTPUT CONTROL UNIT OF RADIO COMMUNICATION MODULE

(71) Applicant: Fujikura Ltd., Tokyo (JP)

(72) Inventors: Taku Uchida, Sakura (JP); Yuki Suto, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 18/017,036

(22) PCT Filed: Aug. 18, 2022

(86) PCT No.: PCT/JP2022/031170
§ 371 (c)(1),
(2) Date: Jan. 19, 2023

(87) PCT Pub. No.: WO2023/157346
PCT Pub. Date: Aug. 24, 2023

(65) Prior Publication Data
US 2024/0250703 A1 Jul. 25, 2024

(30) Foreign Application Priority Data
Feb. 16, 2022 (JP) .................. 2022-022053

(51) Int. Cl.
*H04B 1/036* (2006.01)
*H04B 1/04* (2006.01)

(52) U.S. Cl.
CPC .............. *H04B 1/036* (2013.01); *H04B 1/04* (2013.01); *H04B 2001/0416* (2013.01)

(58) Field of Classification Search
CPC .... H03F 2200/451; H03F 3/195; H03F 3/245; H03F 2200/294; H03F 2200/111;
(Continued)

(56) References Cited

U.S. PATENT DOCUMENTS 6,760,311 B1 * 7/2004 Raith .................... H04W 52/36
455/433
8,150,446 B2 * 4/2012 Huan .................. H04W 52/367
455/343.1

(Continued)

FOREIGN PATENT DOCUMENTS

CN 113873619 A 12/2021
JP 2002-531023 A 9/2002
(Continued)

OTHER PUBLICATIONS

W/Japanese International Search Report dated Nov. 8, 2022, issued in counterpart International Application No. PCT/JP2022/031170. (2 pages).
(Continued)

Primary Examiner — Golam Sorowar
(74) Attorney, Agent, or Firm — WHDA, LLP

(57) ABSTRACT

An output control method for adjusting an output of a radio communication module includes a temperature adjustment step, a transmission step, a feedback control step, a measurement step, and an output control step. The temperature adjustment step sets a temperature of the radio communication module to a predetermined set temperature by a temperature adjusting mechanism. The transmission step has a first antenna transmit a radio signal by sending a transmission signal of a predetermined frequency to the radio communication module. The feedback control step controls an output of the transmission signal based on a comparative result between a power value obtained by detecting the transmission signal and a predetermined threshold value of
(Continued)

power. The measurement step receives the radio signal by a second antenna, and measures an equivalent isotropic radiated power of the radio signal. The output control step adjusts an output of the transmission signal based on the equivalent isotropic radiated power measured in the measurement step.

5 Claims, 8 Drawing Sheets

(58) Field of Classification Search
CPC .... H03F 2203/7209; H03F 3/211; H03F 3/72; H03F 2200/447; H03F 2200/468; H03F 1/0211; H03F 1/30; H04B 17/318; H04B 1/0458; H04B 1/44; H04B 1/04; H04B 1/40; H04B 7/0608; H04B 7/0617; H04B 2001/0408; H04B 17/12; H04B 1/006; H04B 1/0483; H04B 1/3838; H04B 1/18; H04B 1/3827; H04B 17/14; H01Q 1/243; H01Q 21/065; H01Q 1/2283; H01Q 9/0414; H01Q 9/0435; H01Q 3/24; H01Q 21/0025; H01Q 21/24; H01Q 21/28; H01Q 9/0442; H01Q 3/28; H01Q 5/28; H01Q 5/378; H01Q 5/40; H01Q 9/045

See application file for complete search history.

(56) References Cited

U.S. PATENT DOCUMENTS

| | | | | |
|---|---|---|---|---|
| 8,494,512 | B2* | 7/2013 | Matsumura | H04W 76/14 340/622 |
| 9,113,474 | B2* | 8/2015 | Kim | H04W 72/51 |
| 11,019,548 | B2* | 5/2021 | Kim | G06F 1/3278 |
| 2015/0163086 | A1* | 6/2015 | Saito | H03G 3/3042 375/298 |
| 2015/0188647 | A1 | 7/2015 | Wang et al. | |
| 2021/0067191 | A1 | 3/2021 | Choi et al. | |

FOREIGN PATENT DOCUMENTS

| | | |
|---|---|---|
| JP | 2003-243997 A | 8/2003 |
| JP | 2005-502233 A | 1/2005 |
| JP | 2005-86424 A | 3/2005 |
| JP | 2006-66719 A | 3/2006 |
| JP | 2006-121420 A | 5/2006 |
| JP | 2006-165985 A | 6/2006 |
| JP | 2006-237822 A | 9/2006 |
| JP | 2015-502708 A | 1/2015 |
| JP | 2015-231113 A | 12/2015 |
| JP | 2017-28404 A | 2/2017 |
| JP | 2020-519152 A | 6/2020 |
| KR | 10-0681190 B1 | 2/2006 |

OTHER PUBLICATIONS

American National Standard for Compliance Testing of Transmitters Used in Licensed Radio Services, ANSI C63.26-2015, IEEE Standard, IEEE, Piscataway, NJ, USA, Jan. 15, 2016 (Jan. 15, 2016), pp. 1-180; cited in the Search Report dated Feb. 19, 2024.

* cited by examiner

OUTPUT CONTROL METHOD OF RADIO COMMUNICATION MODULE, MANUFACTURING METHOD OF RADIO COMMUNICATION MODULE AND OUTPUT CONTROL UNIT OF RADIO COMMUNICATION MODULE

FIELD OF THE INVENTION

The present invention relates to an output control method of a radio communication module, a manufacturing method of a radio communication module and an output control unit of a radio communication module.

Priority is claimed on Japanese Patent Application No. 2022-022053, filed Feb. 16, 2022, the contents of which are incorporated herein.

DESCRIPTION OF RELATED ART

In a radio communication module (for example, refer to Patent Literature 1), transmission power may be subject to constraints by legal regulations. For example, the upper strength limit of the Equivalent Isotropic Radiated Power (EIRP) is regulated by the Radio Act. For this reason, a radio communication module where the transmission power does not diverge off from the regulated value is desirable. To stabilize the transmission power, a radio communication module adopts a method of using an Automatic Level Control (ALC) to adjust the transmission power (for example, refer to Patent Literatures 2 and 3).

CITATION LIST

Patent Literature

[Patent Literature 1] Japanese Unexamined Patent Application, First Publication No. 2005-86424
[Patent Literature 2] Japanese Unexamined Patent Application, First Publication No. 2006-121420
[Patent Literature 3] Japanese Unexamined Patent Application, First Publication No. 2006-237822

SUMMARY OF THE INVENTION

Technical Problem

However, in the above-mentioned adjustment method, a deviation between the power detected in a feedback circuit during the automatic level control and the actual transmission power may exist. For this reason, a method where output of a radio communication module is accurately adjusted is desirable.

The object of the present invention is to provide an output control method capable of accurately adjusting an output of a radio communication module, a manufacturing method of a radio communication module, and an output control unit of a radio communication module.

Solution to Problem

A first embodiment of the present invention provides an output control method for adjusting an output of a radio communication module including a first antenna, the method including a temperature adjustment step that sets a temperature of the radio communication module to a predetermined set temperature by a temperature adjusting mechanism that adjusts the temperature of the radio communication module, a transmission step that has the first antenna transmit a radio signal by sending a transmission signal of a predetermined frequency to the radio communication module, a feedback control step that controls an output of the transmission signal based on a comparative result between a power value obtained by detecting the transmission signal and a predetermined threshold value of power, a measurement step that receives the radio signal by a second antenna that is capable of radio communicating with the first antenna, and measures an equivalent isotropic radiated power of the radio signal, and an output control step that adjusts an output of the transmission signal based on the equivalent isotropic radiated power measured in the measurement step.

According to this configuration, since an output (transmission power) of the transmission signal is adjusted based on the equivalent isotropic radiated power of the radio signal transmitted from the radio communication module, it is possible to accurately adjust the output of the transmission signal. As such, even in the case where fluctuations in frequency characteristics of an antenna, characteristic variations for each module or the like occurs, it is possible to avoid having the transmission power exceed a regulated value. Also, it is also possible to suppress a divergence of a transmission power from values determined by product specifications.

Also, in the output control step, the threshold value may be changed based on a judgement result of whether the equivalent isotropic radiated power is within a predetermined range or not.

Also, in the output control method of the radio communication module, gain values may be calculated based on the difference between the power value and the threshold value at each set temperature which varies with one another, and in the output control step, the threshold values may be changed according to a comparative result of the plurality of the gain values.

Also, in the output control method of the radio communication module, at each set temperature which varies with one another, an output of the transmission signal may be adjusted by the temperature adjustment step, the transmission step, the feedback control step, the measurement step and the output control step.

A second aspect of the present invention provides a manufacturing method of a radio communication module that provides a memory unit that records information in the radio communication module, and records an appropriate threshold value at the output control step of the output control method of the radio communication module.

A third aspect of the present invention provides an output control unit for adjusting an output of a radio communication module including a first antenna that includes a temperature adjusting mechanism to adjust a temperature of the radio communication module, a signal setting unit that has the first antenna transmit a radio signal by sending a transmission signal of a predetermined frequency to the radio communication module, an ALC control system that controls an output of the transmission signal based on a comparative result between a power value obtained by detecting the transmission signal and a predetermined threshold value of power, a second antenna that is capable of radio communicating with the first antenna, a measurement unit to measure an equivalent isotropic radiated power of the radio signal received by the second antenna, and an output judgement unit that adjusts an output of the transmission signal based on the equivalent isotropic radiated power measured in the measurement unit.

According to this configuration, since the output of the transmission signal (transmission power) is adjusted based on the equivalent isotropic radiated power of radio signal transmitted from the radio communication module, it is possible to accurately adjust the output of the transmission signal. As such, even in the case where fluctuations in frequency characteristics of an antenna, characteristic variations for each module, or the like occurs, it is possible to avoid having the transmission power exceed a regulated value. Also, it is also possible to suppress a divergence of a transmission power on values determined by product specifications.

Advantageous Effects of Invention

According to the above-mentioned aspect of the present invention, it is possible to accurately adjust an output of a radio communication module.

DETAILED DESCRIPTION OF THE INVENTION

First Embodiment

Figure 1:
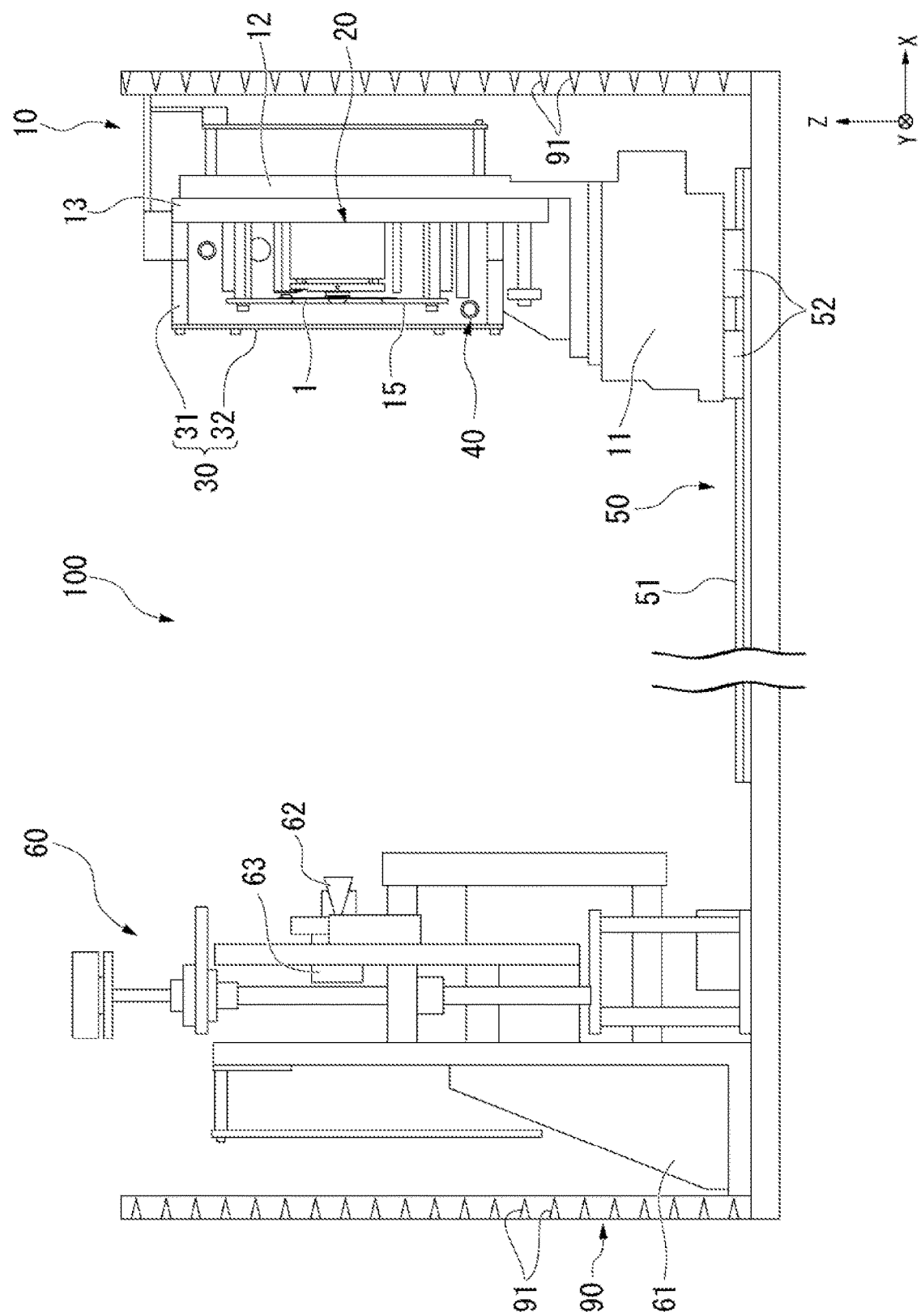
FIG. 1 is a diagram of an embodiment of an output control unit of a radio communication module.
Figure 2:
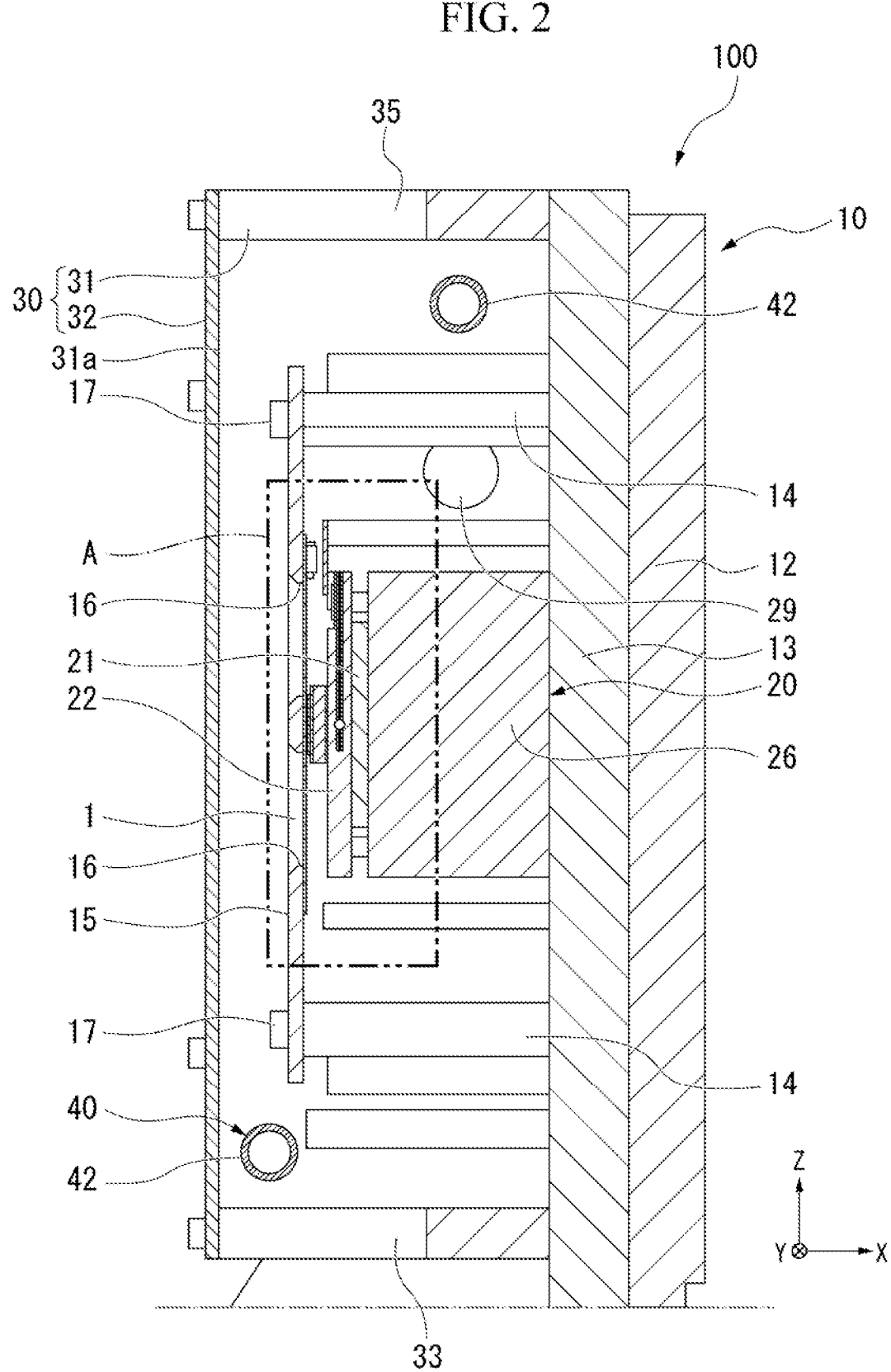
FIG. 2 is a diagram of a portion of a module holding unit.
Figure 3:
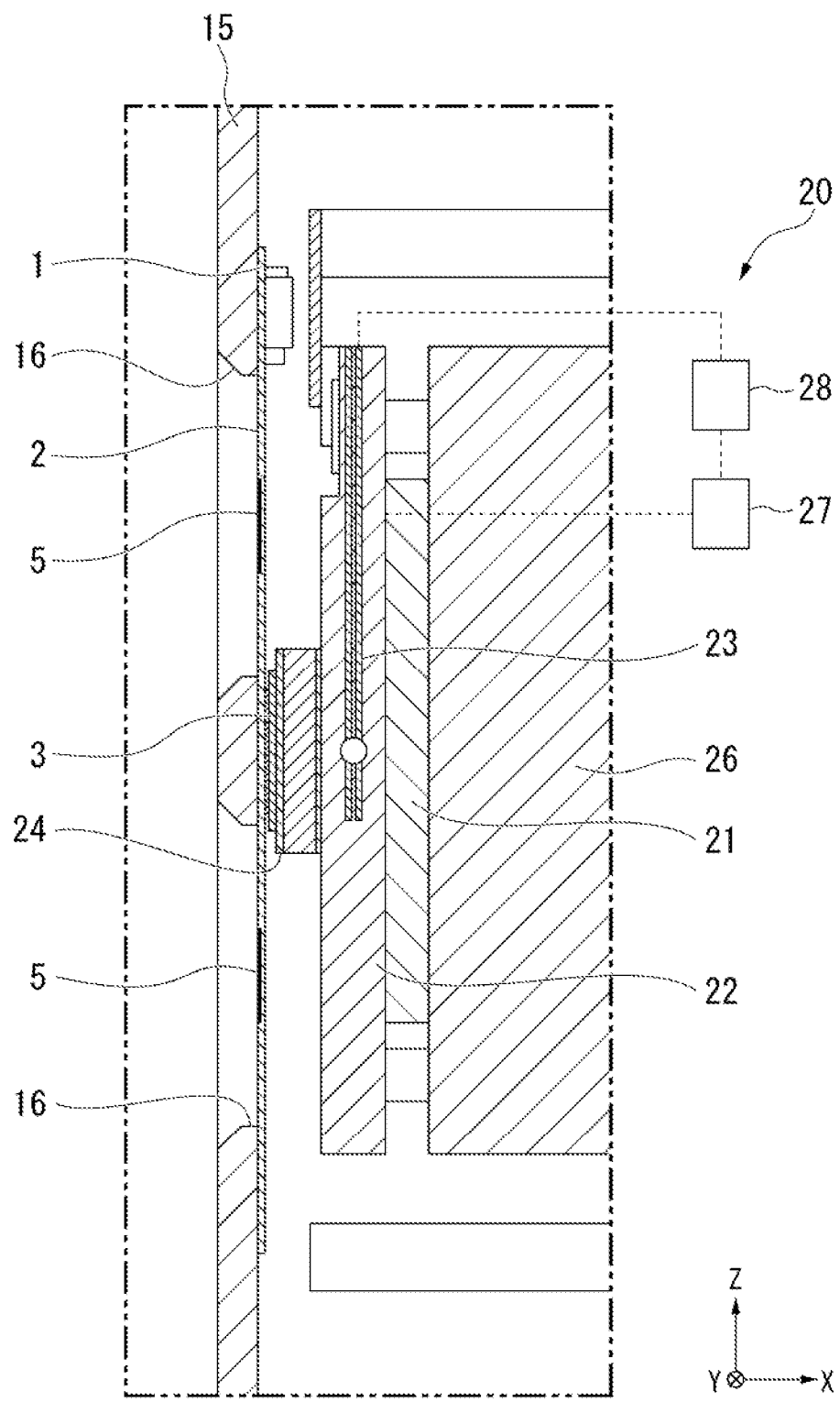
FIG. 3 is a diagram of a radio communication module and a temperature adjusting mechanism.
Figure 4:
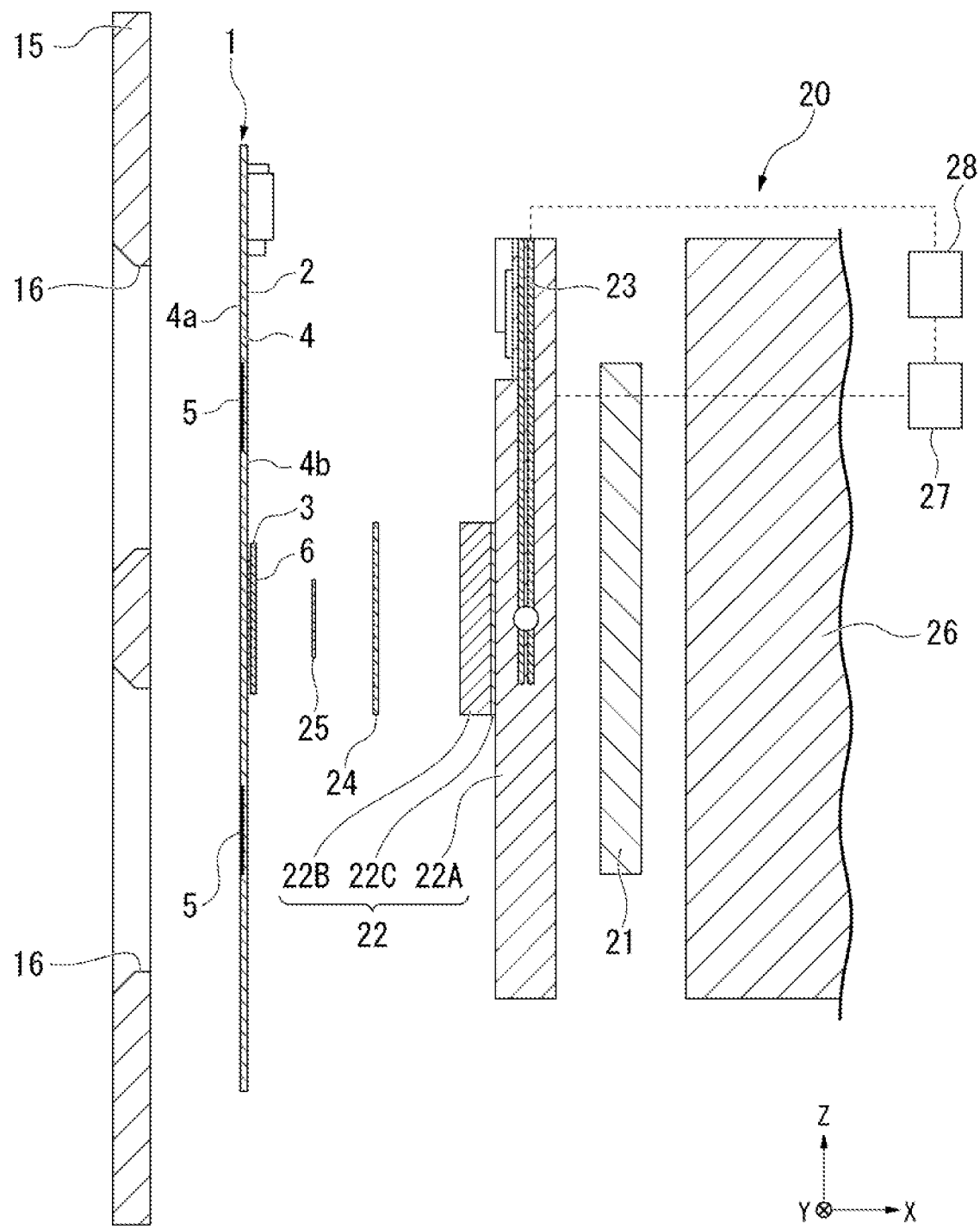
FIG. 4 is an exploded view of a radio communication module and a temperature adjusting mechanism.

FIG. 1 is a diagram of a first embodiment of an output control unit 100 of a radio communication module. The output control unit of the radio controlled module may simply be referred to as an "output control unit". FIG. 2 is a diagram of a portion of a module holding unit 10. FIG. 3 is diagram of a radio communication module 1 and a temperature adjusting mechanism 20. FIG. 3 is an enlarged view of portion A shown on FIG. 2. FIG. 4 is an exploded view of the radio communication module 1 and the temperature adjusting mechanism 20.
<Definition of Directions>

An X direction, a Y direction, and a Z direction are defined as follows. The X direction is a direction where the module holding unit 10 and a measurement antenna unit 60 are arranged. The +X direction is a direction from the measurement antenna unit 60 towards the module holding unit 10. The Z direction is an up-down direction. The +Z direction is an upward direction. The Y direction is a direction orthogonal to the X direction and Z direction. As for the module holding unit 10, a direction that gets closer to the measurement antenna unit 60 is referred to as a "front" direction. As for the measurement antenna unit 60, a direction that gets closer to the module holding unit 10 is referred to as a "front" direction. Furthermore, positional relationships decided herein of the orientation of the output control unit 100 during usage are not limited to the orientation thereof.

[Radio Communication Module]

As shown in FIG. 1 and FIG. 2, the output control unit 100 adjusts the output of the radio communication module 1. Before explaining the output control unit 100, the radio communication module 1 is explained.

As shown in FIG. 4, the radio communication module 1 includes an antenna base plate 2 and an RFIC 3.

The antenna base plate 2 includes a rectangular plate substrate 4 and a first antenna 5. The substrate 4, for example, is formed of a material having a small dielectric loss tangent (in other words, small losses at high frequency signals), and good transmission properties of high frequency signals. The first antenna 5 is formed on a first surface 4a (a surface in the −X direction), which is one of the surfaces of the substrate 4, or on an inner part of the substrate 4.

The first antenna 5 is not particularly limited. For example, the antenna pattern 5 may be an array antenna or a phased array antenna which a plurality of radiating elements (not shown in figures) are formed in a two-dimensional shape on the first surface 4a. The first antenna 5 for example, may be any antenna which may include a linearly shaped antenna, a flat surface antenna, a microstrip antenna, a patch antenna and so on.

The RFIC 3 includes a high frequency signal processing integrated circuit (RFIC: Radio Frequency Integrated Circuit) for millimeter wave bands and the like. An example of an IC package that is applicable to the RFIC 3, may be for example, a BGA (Ball Grid Alley), a CSP (Chip Size Package), or an FOWLP (Fan Out Wafer Level Package) and so on. The RFIC 3 is implemented on a second surface 4b (a surface in the +X direction) of the surface on the other side of the antenna base plate 2. The RFIC 3, for example, may be implemented by a connection part which is formed by soldering (SnAgCu or the like) or the like on the second surface 4b of the antenna base plate 2. The RFIC 3 may include a memory unit 6 such as a memory or the like (refer to FIG. 4). The memory unit 6 is capable of recording data.

The RFIC 3 for example, is made out to be a rectangular plate. A dimension of the Y direction of the RFIC 3 is less than a dimension of the Y direction of the antenna base plate 2. A dimension in the Z direction of the RFIC 3 is less than a dimension in the Z direction of the antenna base plate 2.

The radio communication module 1 for example, conducts high frequency signal transmission and reception of millimeter wave bands and the like. Although it is preferable that the radio communication module 1 be able to transmit and receive high frequency signals, the radio communication module 1 may be a radio communication module that conducts transmission only. For frequencies of high frequency signals, for example, 10 GHz to 300 GHz, or 60 GHz to 80 GHz and so on may be mentioned.

[Output Control Unit of Radio Communication Module]

As shown on FIG. 1, the output control unit 100 includes the module holding unit 10, the temperature adjusting mechanism 20, a housing case 30, a gas supplier 40, a motion mechanism 50, the measurement antenna unit 60, and a chamber 90.

(Module Holding Unit)

The module holding unit 10 includes a base 11, a back plate 12, a support plate 13, a plurality of support columns 14 (refer to FIG. 2), and a holding plate 15.

The back plate 12 extends upwards from the upper part of base 11. The support plate 13 overlaps with the front surface (the surface in the −X direction) of the back plate 12. In the embodiment, the back plate 12 and the support plate 13 are disposed to be vertical in the X direction.

As shown on FIG. 2, the support column 14 extends to the front side (the —X direction) from the front surface (the surface in the −X direction) of the support plate 13. The support column 14 as seen from the front, is provided on each of the four ends of the holding plate 15. A receiving hole is formed on a tip surface of the support column 14 (not shown in figures).

The holding plate 15 functions as a holder holding the radio communication module 1. The holding plate 15, for example, is made of a non-metallic material (resin, glass or the like) that is minimally affected by the radio waves transmitted and received by the radio communication module 1. It is preferable that the holding plate 15 be made of a resin. The holding plate 15 may be formed from a fiber reinforced resin. The holding plate 15 may be made from a dielectric material.

The holding plate 15 for example, may be a rectangular plate. A single or a plurality of through openings 16 may be formed on the holding plate 15. The through openings 16 are formed so as to penetrate the holding plate 15 from one side of the surface of the holding plate 15 to the other side of the surface. The through openings 16, as seen from a thickness direction of the holding plate 15, are large enough to include the first antenna 5 of the radio communication module 1.

As shown on FIG. 2, the holding plate 15 is fixed on the tip surface of the support column 14 by a fixture 17. Insertion through holes (not shown in figures) are formed on the four ends of the holding plate 15. The fixture 17 is inserted through the insertion through hole on the holding plate 15, which is inserted into the receiving hole on the support column 14. The fixture 17 is fixed to the receiving hole using screws and the like. From this, the holding plate 15 holds down the radio communication module 1 towards a heat spreader 22 (refer to FIG. 3).

It is possible for the module holding unit 10 to pivot around a rotation axis along the Z direction. From this, the module holding unit 10 may be set to face the measurement antenna unit 60 in any direction. In the embodiment, the module holding unit 10 faces the measurement antenna unit 60 directly. However, because it is possible for the module holding unit 10 to pivot around the pivot axis, it is possible to change the direction that the module holding unit 10 faces in the left-right direction.

(Temperature Adjusting Mechanism)

As shown on FIG. 3 and FIG. 4, the temperature adjusting mechanism 20 adjusts the temperature of the radio communication module 1.

The temperature adjusting mechanism 20 includes a temperature regulator 21, the heat spreader 22, a temperature adjusting sensor 23, a heat transfer sheet 24, a temperature monitoring sensor 25, a heat sink 26, a power source 27, a temperature control unit 28, and a dew point meter 29 (refer to FIG. 2).

The temperature regulator 21, for example, is a rectangular plate. The temperature regulator 21 overlaps the front surface (surface in the −X direction) of the heat sink 26. The temperature regulator 21, for example, is a Peltier element. When current flows in the first direction through the Peltier element due to electrification, the temperature of a surface of one side of the Peltier element increases, while the temperature of the surface on the other side decreases. When current flows in the second direction (opposing direction to that of the first direction) through the Peltier element, the temperature of a surface of one side of the Peltier element decreases, while the temperature of the surface on the other side increases. The temperature of the surface of one side of the Peltier element and temperature of the surface of other side is determined by the magnitude of the current that flows through the Peltier element. In the case where the temperature regulator 21 is the Peltier element, by controlling the current that flows through the temperature regulator 21, it is possible to adjust the temperature of the radio communication module 1.

The temperature regulator 21 contacts the RFIC 3 of the radio communication module 1 through the heat spreader 22 and the heat transfer sheet 24. It can be said that that temperature regulator 21 is in indirect contact with the RFIC 3 of the radio communication module 1. Since the heat spreader 22 and the heat transfer sheet 24 are provided in between the temperature regulator 21 and the radio communication module 1, the temperature regulator 21 is in contact with the RFIC 3 of the radio communication module 1 so as to be capable of transferring heat.

Also, in the embodiment, although the temperature regulator 21 is in indirect contact with the RFIC 3 of the radio communication module 1 so as to be capable of transferring heat, the temperature regulator 21 may be in direct contact with the RFIC 3 of the radio communication module 1 so as to be capable of transferring heat. In other words, the temperature regulator 21 may be in direct contact with the RFIC 3 of the radio communication module 1 without having the heat spreader 22 and the heat transfer sheet 24 interpose therebetween. In this manner, the temperature regulator 21 is in direct or in indirect contact with the RFIC 3 of the radio communication module 1 and is capable of transferring heat.

As shown in FIG. 4, the heat spreader 22 is able to disperse the heat from the temperature regulator 21. The heat spreader 22 is a multilayered structure (double-layered to be precise) which includes a first part 22A and a second part 22B. The first part 22A and the second part 22B are formed of a material with a high thermal conductivity, for example, metals such as copper or aluminum, carbon materials, or the like.

The first part 22A for example, may be a rectangular plate. The first part 22A overlaps the front surface (surface in the −X direction) of the temperature regulator 21. The first part 22A, as seen from a thickness direction, is large enough to include the temperature regulator 21. The first portion 22A faces the temperature regulator 21.

The second part 22B overlaps the front surface (surface in the −X direction) of the first part 22A. The second part 22B, for example, may be a rectangular plate. The second part 22B, as seen from a thickness direction, is large enough to include the RFIC 3 of the radio communication module 1. The second part 22B faces the radio communication module 1.

Between the rear surface of the second part 22B and the front surface of the first part 22A, a stress relief layer 22C is formed. The stress relief layer 22C, for example, may be made from a thermal grease. The second part 22B is in surface contact with the front surface of the first part 22A through the stress relief layer 22C.

The temperature adjusting sensor 23 (temperature sensor) detects the temperature of the heat spreader 22. The temperature adjusting sensor 23, for example, may be built-into the first part 22A of the heat spreader 22. The temperature adjusting sensor 23, for example, may include a thermocouple, a thermistor, a resistance thermometer bulb or the like.

The heat transfer sheet 24 is provided between the front surface of the second part 22B and the rear surface of the RFIC 3 of the radio communication module 1. The heat transfer sheet 24 contacts the front surface of the second part 22B and the rear surface of the RFIC 3. In the embodiment, a portion of the front surface of the heat transfer sheet 24 contacts the rear surface of the RFIC 3 through the temperature monitoring sensor 25. It is possible for the heat transfer sheet 24 to transfer heat from the second part 22B to the RFIC 3.

The temperature monitoring sensor 25 may be a sheet like shape. The temperature monitoring sensor 25 detects the temperature of the RFIC 3. The temperature monitoring sensor 25, for example, may be a thermocouple. The temperature monitoring sensor 25 is provided in between the heat transfer sheet 24 and the RFIC 3. The temperature monitoring sensor 25, as seen from a thickness direction, is smaller than the RFIC 3. By measuring the temperature of the RFIC 3 by the temperature monitoring sensor 25, it is possible to accurately comprehend the temperature of the RFIC 3.

The heat spreader 22, the heat transfer sheet 24 and the temperature monitoring sensor 25 are interposed between the RFIC 3 of the radio communication module 1 and the temperature regulator 21.

The heat sink 26 is provided on the rear surface side of the temperature regulator 21. The heat sink 26, for example, may be a water-cooled, or an air-cooled heat sink or the like. It is desirable for the heat sink 26 to be a water-cooled heat sink. The heat sink 26 is placed on the front surface of the support plate 13 (refer to FIG. 2).

It is possible for the heat sink 26 to increase or decrease the temperatures of the temperature regulator 21 and the RFIC 3 of the radio communication module 1 in a short period of time.

The power source 27 supplies power to the temperature regulator 21.

The temperature control unit 28 adjusts a temperature of the temperature regulator 21 by controlling the current that flows from the power source 27 to the temperature regulator 21, based on a detected value of the temperature adjusting sensor 23.

The dew point meter 29 measures the dew point inside the housing case 30 (refer to FIG. 2).

(Housing Case)

As shown in FIG. 2, the housing case 30 houses the radio communication module 1 and the temperature regulator 21. The housing case 30 includes a case main body 31, and a shutter plate 32. The case main body 31 extends to the front side from the front surface of the support plate 13. The case main body 31 includes a bottom plate 33, a pair of side plates (not shown in figures), and a top plate 35. The shutter plate 32 functions as a lid element that covers the front surface opening of the case main body 31. The shutter plate 32 for example, is formed of a dielectric foam.

(Gas Supplier)

The gas supplier 40 includes a supply source (not shown in figures) of the dry gas, a plurality of intake passages 42, and a plurality of release parts (not shown in figures). The intake passages 42 guide the dried gas supplied from the supply source to the release parts. The release parts supply dry gas to the inside of the housing case 30.

(Motion Mechanism)

As shown on FIG. 1, the motion mechanism 50 includes a slide rail 51 and a slider 52.

The slide rail 51 is installed on the base surface of the chamber 90. The slide rail 51 is a straight rail that extends along the X direction. The slider 52 is provided on the bottom part of the module holding unit 10. The slider 52 is movable along the slide rail 51. The module holding unit 10 is movable along the slide rail 51 in the X direction due to the slider 52. For this reason, it is possible to determine the separation distance from the measurement antenna unit 60 to the module holding unit 10 freely.

(Measurement Antenna Unit)

The measurement antenna unit 60 includes a supporter 61, a second antenna 62, and an equivalent isotropic radiated power measurement unit 63.

The second antenna 62 transmits and receives measurement radio waves. The second antenna 62, for example, transmits and receives high frequency signals of millimeter wave bands. For frequencies of high frequency signals, for example, 10 GHz to 300 GHz, or 60 GHz to 80 GHz and so on may be mentioned. The second antenna 62 is installed so as to oppose the radio communication module 1. The second antenna 62 is capable of radio communication with a first antenna 5 of the radio communication module 1. The second antenna 62 is provided on the front surface side of the supporter 61.

The equivalent isotropic radiated power measurement unit 63 (measurement unit) measures the equivalent isotropic radiated power (EIRP) of the radio signal received by the second antenna 62. The equivalent isotropic radiated power measurement unit 63 for example, may be a wattmeter that measures high-frequency power. Equivalent isotropic radiated power is also referred to as "effective isotropic radiated power". The equivalent isotropic radiated power measurement unit 63 is supported by the supporter 61. The equivalent isotropic radiated power measurement unit 63 is also referred to as a "power measurement unit 63".

(Chamber 90)

The chamber 90 houses the module holding unit 10, the temperature adjusting mechanism 20, the housing case 30, the gas supplier 40, the motion mechanism 50, and the measurement antenna unit 60. A radio wave absorber 91 is provided on an inner surface of the chamber 90. The chamber 90 is not affected by electromagnetic waves from its surroundings, and it is possible for the chamber 90 to suppress electromagnetic waves from escaping to the surroundings. It is possible for the chamber 90 to suppress electromagnetic waves from echoing on the inside of the chamber 90.

[Output Control Method of the Radio Communication Module]

An output control method of the radio communication module 1 which includes the first antenna 5 by using the output control unit 100 shown in FIG. 1 is explained.

Figure 5:
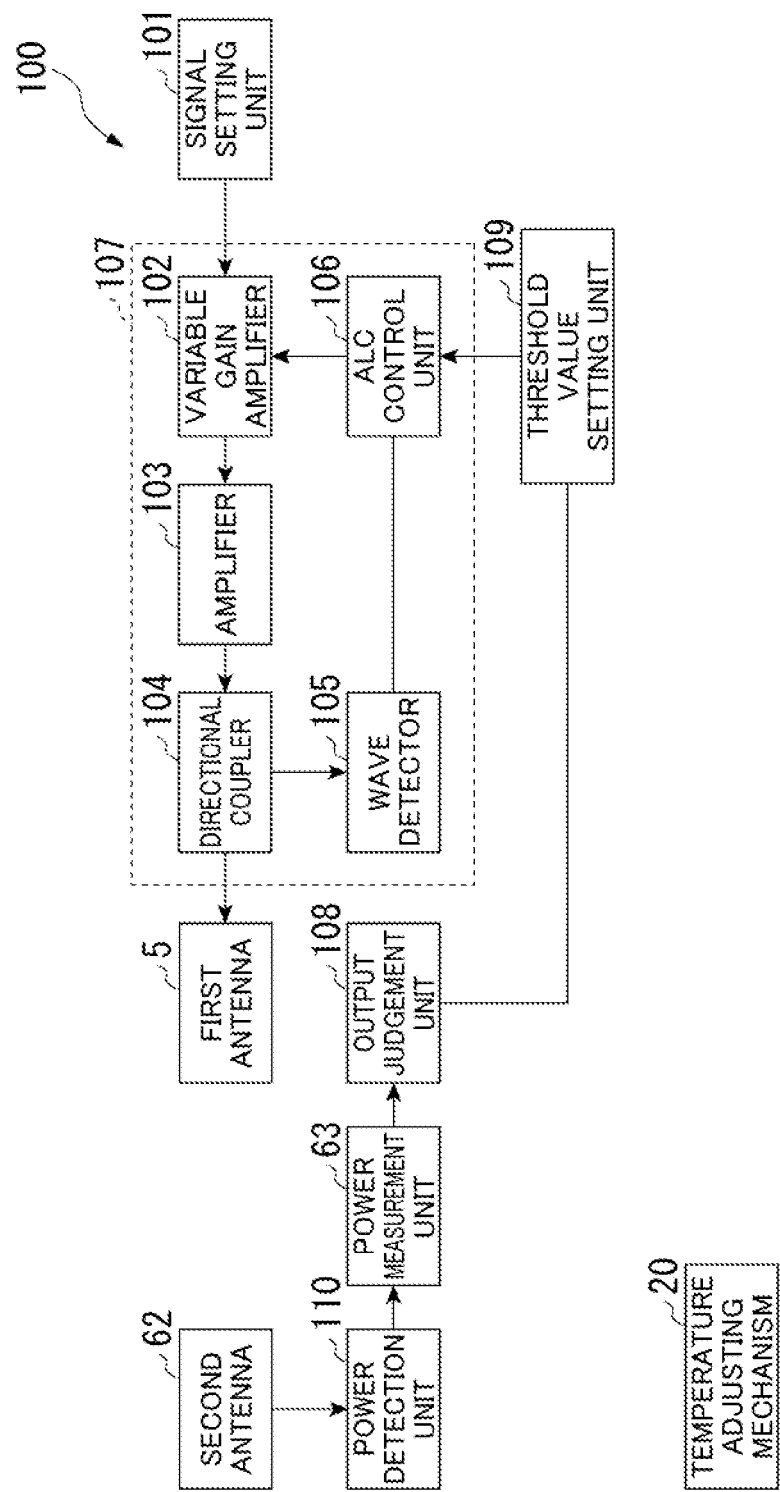
FIG. 5 is a block diagram of an output control unit of a radio communication module of a first embodiment.

FIG. 5 is a block diagram of an output control unit 100 of a first embodiment.

As shown in FIG. 5, the output control unit 100 includes the temperature adjusting mechanism 20 (refer to FIG. 3 and FIG. 4), a signal setting unit 101, a variable gain amplifier 102, an amplifier 103, a directional coupler 104, a wave detector 105, an ALC control unit 106, the second antenna 62 (refer to FIG. 1), a power detection unit 110, the power measurement unit 63, an output judgement unit 108, and a threshold value setting unit 109.

The signal setting unit 101 sends a transmission signal of a predetermined frequency, forcing the first antenna 5 to transmit a radio signal. In the signal setting unit 101, it is possible to modulate the transmission signal to be compatible with the radio communication.

The variable gain amplifier 102 is able to control the transmission power of the transmission signal from the signal setting unit 101. The variable gain amplifier 102 changes the gain based on a threshold value set in the threshold value setting unit 109 such that the power value obtained at the wave detector 105 is within the threshold value, and controls the transmission power.

The amplifier 103 amplifies the transmission signal from the variable gain amplifier 102 to be compatible with the level of the radio communication.

The directional coupler 104 distributes the transmission signal from the amplifier 103 to the first antenna 5 and the wave detector 105.

The first antenna 5 receives a transmission signal from the directional coupler 104 and transmits a radio signal. The radio signal transmitted by the first antenna 5 is a signal that the transmission signal from the signal setting unit 101 has been amplified.

An ALC control system 107 is configured from the variable gain amplifier 102, the amplifier 103, the directional coupler 104, the wave detector 105, and the ALC control unit 106.

"ALC" stands for "Automatic Level Control". The ALC control unit is the "automatic level control unit". The ALC control system is the "automatic level control system".

The wave detector 105 detects the transmission power of the transmission signal (a signal that the transmission signal from the signal setting unit 101 is amplified) from the directional coupler 104, and obtains a power value.

The ALC control unit 106 compares the power value obtained at the wave detector 105 with a predetermined threshold value of power, and obtains the difference between the power value and the threshold value as a comparative result. Here, the predetermined threshold value of power may for example, be determined based on a regulated value of the transmission power required by the Radio Act. The predetermined threshold value of the power may also be a value in the range determined by the product specification.

The ALC control unit 106 adjusts the gain of the variable gain amplifier 102 based on the comparative result mentioned above.

Also, the configuration of the ALC control system is not limited to the example explained herewith.

The second antenna 62 receives the radio signal transmitted by the first antenna 5.

The power detection unit 110 detects the power of the radio signal received by the second antenna 62.

The power measurement unit 63 measures the equivalent isotropic radiated power (EIRP) based on the detected value obtained at the power detection unit 110.

The output judgement unit 108 judges whether the equivalent isotropic radiated power obtained in the power measurement unit 63 is within the range predetermined by a specification or not. The predetermined range of the equivalent isotropic radiated power determined by a specification for example, may be determined based on a regulated value of the transmission power required by the Radio Act. The predetermined range of the equivalent isotropic radiated power determined by a specification may also be a range determined by the product specification.

Figure 6:
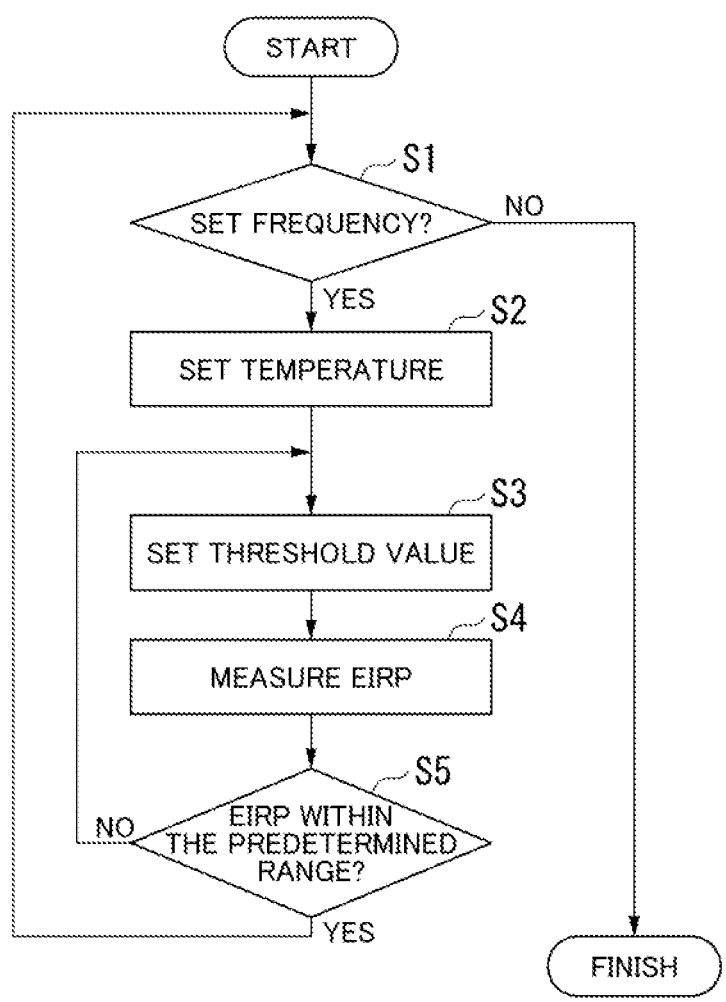
FIG. 6 is a flow diagram showing an output control method of a radio communication module of a first embodiment.

FIG. 6 is a flow diagram showing an output control method of a radio communication module of the first embodiment. From hereon, an output control method of the first embodiment is explained referring to FIG. 6.

(Step S1) The signal setting unit 101 sets the frequency of the transmission signal (frequency setting step). In the case where the radio communication module 1 capable of transmitting and receiving multiple channels is used, the transmission signal frequency may be, for example, a single frequency of a channel chosen from a plurality of channels. In the embodiment, the frequency is set to "the first frequency".

(Step S2) The temperature adjusting mechanism 20 renders the radio communication module 1 to be a predetermined set temperature. In the embodiment, the set temperature is "the first temperature".

As shown in FIG. 3 and FIG. 4, by using the temperature regulator 21, the temperature of the radio communication module 1 is set (temperature adjustment step). The temperature control unit 28 is able to adjust the temperature of the temperature regulator 21 by controlling the current that flows from the power source 27 to the temperature regulator 21 based on a detected value of the temperature adjusting sensor 23. The temperature control unit 28, for example, is able to raise the temperature of the temperature regulator 21 by increasing the current that flows to the temperature regulator 21 when the detected value is less than a lower limit value of a predetermined set range. The temperature control unit 28, for example is able to lower the temperature of the temperature regulator 21 by decreasing the current that flows to the temperature regulator 21 when the detected value is greater than an upper limit value of a predetermined set range. From this, the temperature of the radio communication module 1 is set to a target temperature.

(Step S3) The threshold value setting unit 109 sets the threshold value used in the ALC control (refer to FIG. 6).

As shown in FIG. 5, the ALC control unit 106 compares the power value obtained at the wave detector 105 and the threshold value. In the case where the power value is not within the threshold value, as shown in the following, the gain of the variable gain amplifier 102 is adjusted.

The variable gain amplifier 102 controls the transmission power of the transmission signal based on the control signal from the ALC control unit 106 (feedback control step). For example, in the case where the power value obtained at the wave detector 105 exceeds the upper limit value of the range of the threshold value, the gain of the variable gain amplifier 102 is decreased, lowering the transmission power. In the case where the power value is below the lower limit value of the range of the threshold value, the gain of the variable gain amplifier 102 is increased, raising the transmission power. In this manner, the ALC control unit 106 controls the output (transmission power) of the transmission signal based on the comparative result of the power value of the transmission signal (a signal that the transmission signal from the signal setting unit 101 has been amplified) obtained at the wave detector 105 and the threshold value.

(Step S4) The first antenna 5 receives the transmission signal from the directional coupler 104, and transmits the radio signal (transmission step).

The second antenna 62 receives a radio signal from the first antenna 5. The power detection unit 110 detects the power of the radio signal received by the second antenna 62. The power measurement unit 63 measures the equivalent isotropic radiated power (EIRP) based on the detected value obtained at the power detection unit 110 (measurement step) (refer to FIG. 6). Step S4 includes the transmission step and the measurement step.

(Step S5) The output judgement unit 108 judges whether the equivalent isotropic radiated power measured in the power measurement unit 63 is within a predetermined range that is preset. In the case where the obtained judgement result indicates that the equivalent isotropic radiated power is not within the above mentioned range, the step is returned to step S3, and the threshold value is changed (reset) in the threshold setting unit 109.

When the threshold value is changed, the difference between the power value of the transmission signal (a signal that the transmission signal from the signal setting unit 101 has been amplified) obtained from the wave detector 105 and the threshold value changes. For this reason, the control signal from the ALC control unit 106 to the variable gain amplifier 102 changes, as well as the transmission power of the transmission signal from the variable gain amplifier 102 changes. As a result, the power of the radio signal (a signal that the transmission signal from the signal setting unit 101 has been amplified) which the first antenna 5 transmits changes. From this, the power of the radio signal detected at the power detection unit 110 changes, as well as the equivalent isotropic radiated power obtained at the power measurement unit 63 changes.

As shown in FIG. 6, in step S5, in the case where the equivalent isotropic radiated power is judged not to be within the predetermined range, once again, the step is returned to step S3.

Accordingly, when the equivalent isotropic radiated power is judged not to be within the predetermined range, steps S3 to S5 are repeated until the equivalent isotropic radiated power is judged to be within the predetermined range.

In the case where the equivalent isotropic radiated power is judged to be within the predetermined range, the threshold value is not changed, and the step is returned to step S1. The threshold value is judged to be appropriate. From this, an appropriate threshold value is determined at the first frequency and the first temperature. In this manner, the output of the transmission signal (transmission power) is adjusted (output control step). Since the output judgement unit 108 conducts the above mentioned judgement, the output judgement unit 108 is involved in the adjustment step of the output of the transmission signal.

The set temperature may be changed from the first temperature to the second temperature, and the same output control may be conducted. From this, an appropriate threshold value at the second temperature is obtained.

The equivalent isotropic radiated power typically has a tendency to increase as the temperature decreases. Temperature characteristics exist in the ALC control as well, and the more the temperature decrease the more the equivalent isotropic radiated power tends to increase. For this reason, in the case where the first temperature is close to the lower limit temperature (for example −10 degrees C.) in the operating environment of the radio communication module 1, it is possible to comprehend a value close to the upper limit value of the variation range of the equivalent isotropic radiated power. As such, it is easier to avoid having the transmission power surpass a regulated value (for example, a value regulated by the Radio Act).

In the case where the second temperature is a high temperature (for example 60 degrees Celsius) in the operating environment of the radio communication module 1, it is possible to comprehend a value close to the lower limit value of the variation range of the equivalent isotropic radiated power. As such, it is possible to avoid having the transmission power greatly fall short of a value determined by product specifications.

The number of temperature conditions required to determine an appropriate threshold value is not limited to one or two. The number of the temperature conditions may be one, or may be a plurality (an arbitrary number greater than or equal to two).

In the case where an appropriate threshold value of a frequency (a second frequency) different than the frequency of the first frequency is needed, the signal setting unit 101 changes (resets) the frequency in step S1 to the frequency of the second frequency. The second frequency may be a frequency of a different channel chosen from a plurality of channels. Similar to the output control in the first frequency, an appropriate threshold value in the second frequency is determined (steps S2 to S5). The number of frequency conditions needed for determining an appropriate threshold value is not limited to one or two. The number of frequency conditions may be one, or may be a plurality (an arbitrary number greater than or equal to two).

In the case where no new frequency needs to be set, the step terminates (step S1).

[Manufacturing Method of Radio Communication Module Including Threshold Value Information]

The "appropriate threshold value" obtained at the output control method mentioned above is able to be recorded to the memory unit 6 of the RFIC 3 (refer to FIG. 4). Based off of this, it is possible to obtain the radio communication module 1 including the information of the appropriate threshold value. As such, output control becomes easier by the threshold value included in the memory unit 6 which is specific to each radio communication module 1.

[Effects that the Output Control Method in the First Embodiment Achieves]

According to the output control method of the embodiment, since an output (transmission power) of the transmission signal is adjusted based on the equivalent isotropic radiated power of the radio signal transmitted from the radio communication module 1, it is possible to accurately adjust the output of the transmission signal. As such, even in the case where fluctuations in frequency characteristics of an antenna, characteristic variations for each module or the like occurs, it is possible to avoid having the transmission power exceed a regulated value. Also, it is also possible to suppress a divergence of a transmission power from values determined by product specifications.

According to the output control method of the embodiment, in the output control step, it is determined whether the equivalent isotropic radiated power is within a predetermined range or not, and based on the judgement result, the threshold value is changed (reset) as needed. From this, it is possible to determine an appropriate threshold value by simple processing.

According to the output control method of the embodiment, it is possible to control the output at a plurality of set temperatures (for example, the first temperature and the second temperature). In this case, it is possible to avoid having the transmission power exceed a regulated value, and it is possible to avoid having the transmission power greatly be below a value determined by the product specifications. As such, it is possible to increase the stability of the transmission power.

The temperature adjusting mechanism 20 includes the heat spreader 22, the temperature adjusting sensor 23, and the temperature control unit 28. The temperature control unit 28 adjusts the temperature of the temperature regulator 21 by controlling the current that flows from the power source 27 to the temperature regulator 21, based off of the detected value of the temperature adjusting sensor 23. As such, it is possible to stably determine the temperature of the radio communication module 1. As such, it is possible to accurately adjust the output (transmission power) of the transmission signal of the radio communication module 1 according to the temperature of the radio communication module 1. Also, it is possible to determine the threshold value of the radio communication module 1 at the lower limit and the upper limit temperatures in the operating environment of the radio communication module 1.

The temperature regulator 21 is in direct or in indirect contact with the radio communication module 1 so as be capable of transferring heat. For this reason, as opposed to the case of determining a temperature of the radio communication module 1 by adjusting a temperature of the gas inside the chamber 90, it is possible to have the temperature of the radio communication module 1 reach a target temperature in a short period of time. Further, since heat transfer configured to be through direct or indirect contact with the temperature regulator 21 is used, it is possible to stably determine the temperature of the radio communication module 1. As such, it is possible to accurately adjust the output (transmission power) of the transmission signal of the radio communication module 1.

[Effects that the Output Control Unit in the Embodiment Achieves]

According to the output control unit 100 of the embodiment, since the output (transmission power) of the transmission signal is adjusted based on the equivalent isotropic radiated power of radio signal transmitted from the radio communication module 1, it is possible to accurately adjust the output of the transmission signal. As such, even in the case where fluctuations in frequency characteristics of an antenna, characteristic variations for each module or the like occurs, it is possible to avoid having the transmission power exceed a regulated value. Also, it is possible to suppress a divergence of a transmission power on values determined by product specifications.

Second Embodiment

Figure 7:
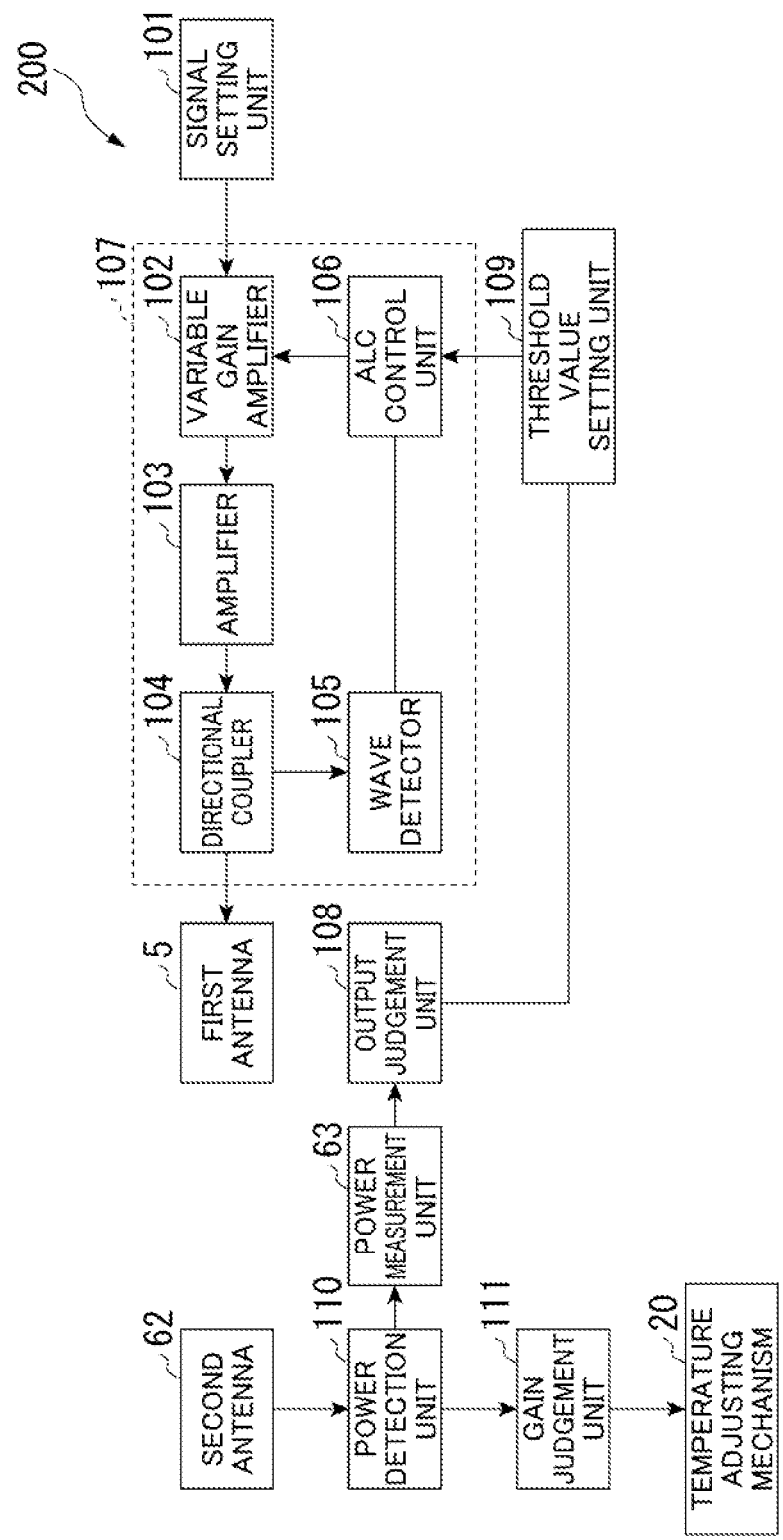
FIG. 7 is a block diagram of an output control unit of a radio communication module of a second embodiment.
Figure 8:
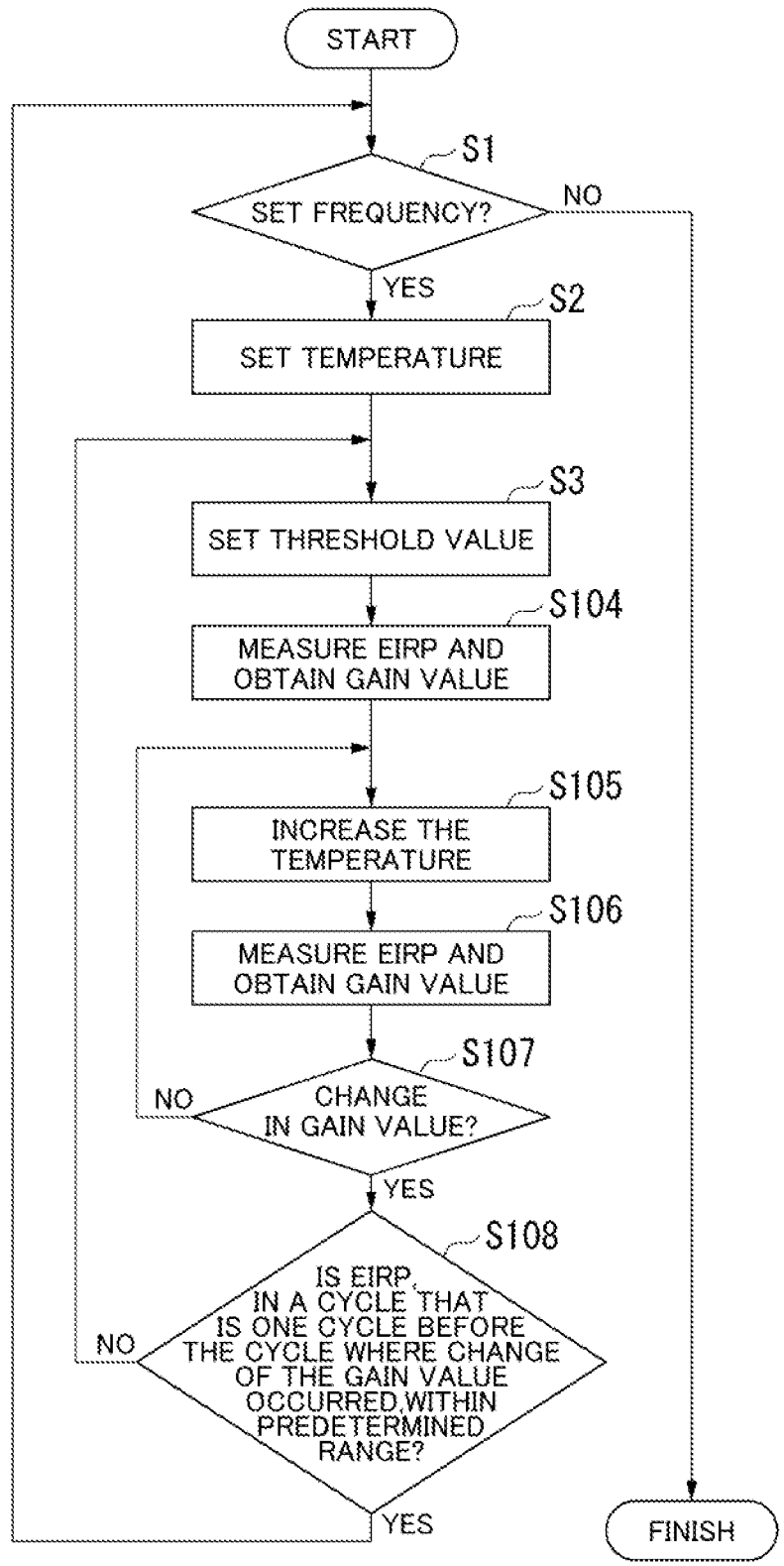
FIG. 8 is a flow diagram showing an output control method of a radio communication module of a second embodiment.

FIG. 7 is a block diagram of an output control unit 200 of a second embodiment. FIG. 8 is a flow diagram showing an output control method of a radio communication module of a second embodiment. The same or equivalent configurations as those in the first embodiment shown in FIG. 5 and FIG. 6 are designated by the same reference signs, and descriptions thereof are simplified or omitted.

As shown in FIG. 7, the aspect which the output control unit 200 differs from the output control unit 100 shown in FIG. 5 is that the output control unit 200 includes a gain judgement unit 111.

The output control method of the second embodiment is explained in detail referring to FIG. 8.

As shown in FIG. 8, steps S1 to S3 are similar to the output control method of the first embodiment shown in FIG. 6. The primary set temperature is the first temperature. The frequency is the first frequency. The power value obtained at the wave detector 105 is for example within the range of the threshold value mentioned above.

(Step S104) The first antenna 5 receives the transmission signal (a signal that the transmission signal from the signal setting unit 101 has been amplified) from the directional coupler 104, and transmits the radio signal (transmission step). The second antenna 62 receives a radio signal from the first antenna 5. The power detection unit 110 detects the power of the radio signal received by the second antenna 62. The power measurement unit 63 measures the equivalent isotropic radiated power (EIRP) based on the detected value obtained at the power detection unit 110 (measurement step).

The ALC control unit 106 calculates the gain value based on the difference between the power value obtained at the wave detector 105 and the threshold value.

(Step S105) The set temperature of the radio communication module 1 is set to the second temperature that is a temperature higher than the first temperature.

(Step S106) The first antenna 5 transmits a radio signal (transmission step). The second antenna 62 receives the radio signal. The power detection unit 110 detects the power of the radio signal received by the second antenna 62. The power measurement unit 63 measures the equivalent isotropic radiated power (EIRP) based on the detected value (measurement step). The ALC control unit 106 calculates the gain value based on the difference between the power value obtained at the wave detector 105 and the threshold value.

(Step S107) The gain judgement unit 111 (refer to FIG. 7) compares the gain value calculated at step S104 and the gain value calculated at step S106. The gain judgement unit 111 judges whether the gain value of the case where the set temperature is the second temperature is changed with respect to the gain value of the case where the set temperature is the first temperature, or not. In the case where the power value obtained at the wave detector 105 is within the range of the threshold value, the gain value does not change. If the power value is off from the range of the threshold value, the gain value changes.

In the case where there is no change in the gain value, the step is returned to step S105. With the set temperature being a higher temperature (Step S105), the first antenna 5 transmits a radio signal. The power measurement unit 63 measures the equivalent isotropic radiated power. The ALC control unit 106 calculates the gain value (step S106). The gain judgement unit 111 judges whether the gain value is changed, or not based on the comparative result of a plurality of gain values (specifically, the change of the gain value with respect to the previous gain value).

In this manner, as the set temperature is increased step by step, cycles of the steps S105 to S107 are repeated until the gain value changes. In the case the gain value changes, step S108 below is conducted.

(Step S108) The output judgement unit 108 judges whether the equivalent isotropic radiated power is within a predetermined range or not in a cycle (referred to as "prior cycle") that is one cycle before the cycle where change of the gain value occurred. If a judgement result that indicates the equivalent isotropic radiated power is not within the predetermined range is obtained, the step is returned to step S3, and changing (resetting) of the threshold value is conducted.

In the case where the equivalent isotropic radiated power in the prior cycle is judged to be within a predetermined range, changing of the threshold value is not conducted, and the step is returned to step S1. The threshold value in the prior cycle is judged to be appropriate. From this, an appropriate threshold value is determined. In this manner, the output (transmission power) of the transmission signal is adjusted (output control step).

The primary set temperature may be changed from the first temperature to the second temperature, and similar output control may be conducted. The number of temperature conditions needed to decide an appropriate threshold value may be one, or may be a plurality (an arbitrary number greater than or equal to two).

In the case where an appropriate threshold value of a frequency (a second frequency) different than the frequency of the first frequency is needed, the signal setting unit 101 changes (resets) the frequency in step S1 to the frequency of the second frequency. The number of frequency conditions needed for determining an appropriate threshold value may be one, or may be a plurality (an arbitrary number greater than or equal to two).

Furthermore, although in the embodiment, as the set temperature is increased step by step, cycles of the steps S105 to S107 are repeated, cycles of the steps S105 to S107 may be repeated as the set temperature is decreased step by step.

[Effects that the Output Control Method of the Second Embodiment Achieves]

According to the output control method of the embodiment, since an output (transmission power) of the transmission signal is adjusted based on the equivalent isotropic radiated power of the radio signal transmitted from the radio communication module 1, it is possible to accurately adjust the output of the transmission signal. As such, even in the case where fluctuations in frequency characteristics of an antenna, characteristic variations for each module or the like occurs, it is possible to avoid having the transmission power exceed a regulated value. Also, it is also possible to suppress a divergence of a transmission power on values determined by product specifications In an output control method of this embodiment, gain values are calculated at each set temperature which varies with one another, and a threshold value is changed (reset) as needed, based on the comparative result of the plurality of the gain values (specifically, the change in the gain value as compared to the prior gain value). For this reason, with simple processing, it is possible to more accurately determine an appropriate threshold value compared to the first embodiment.

The technical scope of the present invention is not limited to any of the previously mentioned embodiments, and it is possible to apply appropriate changes so long as they do not depart from the objective of the present invention.

As the temperature regulator 21 shown on FIG. 3 and FIG. 4, a Peltier element was used as an example. However, the temperature regulator is not limited thereto. The temperature regulator may be a heater of a heating wire or the like of a nichrome wire or the like. The temperature regulator may include a heating medium circulation structure that distributes the heat medium (fluid body). Also, the temperature regulator may include a cooling mechanism such as a chiller (a device that circulates cool water) or the like.

EXPLANATION OF REFERENCE SYMBOLS

1 . . . Radio Communication Module
5 . . . First Antenna
20 . . . Temperature Adjusting Mechanism
62 . . . Second Antenna
63 . . . Equivalent Isotropic Radiated Power Measurement Unit (Measurement Unit)
100, 200 . . . Output Control Unit of the Radio Communication Module
101 . . . Signal Setting Unit
107 . . . ALC Control System
108 . . . Output Judgement Unit

The invention claimed is:

1. An output control method for adjusting an output of a radio communication module including a first antenna comprising:
setting a temperature of the radio communication module to a predetermined set temperature by a temperature adjustor that adjusts the temperature of the radio communication module,
having the first antenna transmit a radio signal by sending a transmission signal of a predetermined frequency in the radio communication module,
controlling an output of the transmission signal based on a comparative result between a power value obtained by detecting the transmission signal and a predetermined threshold value of power,
receiving the radio signal by a second antenna that is capable of radio communicating with the first antenna, and measuring an equivalent isotropic radiated power of the radio signal, and
adjusting an output of the transmission signal based on the measured equivalent isotropic radiated power, wherein
a first gain value is calculated based on a difference between the power value at a first temperature and the threshold value, and a second gain value is calculated based on a difference between the power value at a second temperature which varies with the first temperature and the threshold value, and
when adjusting the output of the transmission signal, the threshold value is changed according to a comparative result of the first gain value and the second gain value.

2. The output control method of the radio communication module according to claim 1, wherein
when adjusting the output of the transmission signal, the threshold value is changed based on a judgement result of whether the equivalent isotropic radiated power is within a predetermined range or not.

3. The output control method of the radio communication module according to claim 1, wherein
at each set temperature which includes the first temperature and the second temperature, an output of the transmission signal is adjusted.

4. A manufacturing method of a radio communication module comprising:
providing a memory that records information in the radio communication module, and
recording an appropriate threshold value that adjusted based on the output control method of the radio communication module according to claim 2.

5. An output controlling circuitry for adjusting an output of a radio communication module including a first antenna comprising:
a temperature adjustor configured to adjust a temperature of the radio communication module,
a signal setting circuitry configured to have the first antenna transmit a radio signal by sending a transmission signal of a predetermined frequency in the radio communication module,
an ALC controlling circuitry configured to control an output of the transmission signal based on a comparative result between a power value obtained by detecting the transmission signal and a predetermined threshold value of power,
a second antenna that is capable of radio communicating with the first antenna,
a measurement circuitry configured to measure an equivalent isotropic radiated power of the radio signal received by the second antenna, and
an output judgement circuitry configured to adjust an output of the transmission signal based on the equivalent isotropic radiated power measured in the measurement unit, wherein
a first gain value is calculated based on a difference between the power value at a first temperature and the threshold value, and a second gain value is calculated based on a difference between the power value at a second temperature which varies with the first temperature and the threshold value, and when adjusting the output of the transmission signal, the threshold value is changed according to a comparative result of the first gain value and the second gain value.

* * * * *